US010009708B2

(12) United States Patent
Dewangan et al.

(10) Patent No.: US 10,009,708 B2
(45) Date of Patent: Jun. 26, 2018

(54) SYSTEM AND METHOD FOR MOBILE SENSING DATA PROCESSING

(71) Applicant: Tata Consultancy Services Limited, Mumbai (IN)

(72) Inventors: Keshaw Dewangan, Kolkata (IN); Shahnawaz Alam, Kolkata (IN); Arijit Sinharay, Kolkata (IN); Avik Ghose, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 95 days.

(21) Appl. No.: 15/274,449

(22) Filed: Sep. 23, 2016

(65) Prior Publication Data
US 2017/0265020 A1    Sep. 14, 2017

(30) Foreign Application Priority Data

Mar. 9, 2016  (IN) .............................. 201621008265

(51) Int. Cl.
*H04W 4/00* (2018.01)
*H04W 4/38* (2018.01)
H04L 29/06 (2006.01)
H04L 29/08 (2006.01)

(52) U.S. Cl.
CPC ............. *H04W 4/006* (2013.01); *H04W 4/38* (2018.02); *H04L 67/10* (2013.01); *H04L 67/42* (2013.01)

(58) Field of Classification Search
CPC .................................................. H04W 4/006
See application file for complete search history.

(56) References Cited

U.S. PATENT DOCUMENTS

| 9,256,460 | B2* | 2/2016 | Jacobson | G06F 9/461 |
| 2013/0066688 | A1* | 3/2013 | Pinkus | G06Q 10/06 705/7.41 |
| 2013/0117769 | A1 | 5/2013 | Sharma et al. | |
| 2014/0023096 | A1* | 1/2014 | Czompo | H04J 3/025 370/537 |

(Continued)

OTHER PUBLICATIONS

"Developing Task Model Applications; Aneka 2.0"—Manjasoft, Oct. 22, 2010 http://www.manjrasoft.com/download/2.0/TaskModel.pdf.*

(Continued)

*Primary Examiner* — Randy Scott
(74) *Attorney, Agent, or Firm* — Finnegan, Henderson, Farabow, Garrett & Dunner LLP

(57) ABSTRACT

A system and a method for mobile sensing data processing are provided. The method includes, receiving one or more requests from one or more applications installed at a client device to obtain a processed sensing data obtained in response to execution of one or more tasks by the application using a set of sensors. Raw data is extracted from the set of sensors in response to the execution of the tasks. A data stream is configured to include sensor data and a task information associated with the tasks. The client device is connected with the server to transmit the data stream. The server outputs the processed sensing data upon processing the data stream and the task information by using one or more task specific models stored at the server. The processed sensing data is received from the server and provided to the applications.

14 Claims, 5 Drawing Sheets

(56) References Cited

U.S. PATENT DOCUMENTS

2015/0009212 A1* 1/2015 Tan .................. G06T 15/00
  345/419
2016/0171067 A1* 6/2016 Acker .............. G06F 17/30557
  707/627

OTHER PUBLICATIONS

Gao, W. et al., "User-Centric Incentive Design for Participatory Mobile Phone Sensing", Proceedings of SPIE. The International Society for Optical Engineering, 8 pgs, May 2014.

* cited by examiner

SYSTEM AND METHOD FOR MOBILE SENSING DATA PROCESSING

PRIORITY CLAIM

This U.S. patent application claims priority under 35 U.S.C. § 119 to: India Application No. 201621008265, filed on 9 Mar. 2016. The entire contents of the aforesaid application are incorporated herein by reference.

TECHNICAL FIELD

The present subject matter relates, in general, to mobile sensing, and, more particularly, to a method and system for mobile sensing data processing.

BACKGROUND

Today, mobile devices are configured to include various types of built-in sensors along with powerful processing units and easy internet connectivity that make the mobile devices a perfect tool in today's pervasive sensing and/or computing era. Examples of such mobile devices includes palmtop, personal digital assistant (PDA), cell phone, pocket pc, laptop, smartphone, tablet computer, smartwatch, pager and the like.

The configuration of the mobile devices leads to development of Internet of Things (IoT) enabled intelligent applications across diverse domains. As a result, various complex algorithms are being ported to the mobile devices on regular basis as free or commercial applications. For example, mobile devices can be utilized for estimating a range of parameters for monitoring tasks including motion, location, heart rate and the like. For such monitoring, the sensors embodied in the mobile devices are utilized extensively for collecting various modalities of data (such as, time-series, image, video, pressure, and so on).

The complex applications perform complex processing operations at the mobile devices to enable monitoring by the sensors. However, to perform complex processing operations, the processing and memory capabilities of the mobile devices should match with the complex processing operations. Currently, there is a mismatch between the processing and memory capabilities of the mobile devices and those needed for performing complex processing operations, and hence it takes long processing time for such operations. A mobile sensing framework may be developed that may ease development of mobile device based application, so as to cater for end-to-end mobile sensing solutions and simplify the processing operations performed therefor.

SUMMARY

Embodiments of the present disclosure present technological improvements as solutions to one or more of the above-mentioned technical problems recognized by the inventors in conventional systems. For example, in one embodiment, the method can be executed by a computing device. The method includes, receiving one or more requests from one or more applications installed at a client device to obtain a processed sensing data obtained in response to execution of one or more tasks by the application at the client device using a set of sensors associated with the client device. The client device includes a plurality of sensors. Further, the method includes, extracting raw sensor data from the set of sensors, in response to the execution of the one or more tasks. Furthermore, the method includes, configuring a data stream which includes the raw sensor data extracted from the set of sensors in a predefined format and a task information associated with the tasks. Subsequently, connecting the client device with the server to transmit the data stream to the server. The server outputs the processed sensing data upon processing the data stream and the task information by using one or more task specific models stored at the server. Further, the method includes, receiving the processed sensing data from the server. Finally, the method includes, providing the processed sensing data to the one or more applications.

In another embodiment, computer-implemented system for mobile sensing data processing is provided. The system includes a memory, and a processor. The memory stores instructions, an I/O manager and a sensor data logger. The memory is coupled to the processor, such that the processor is configured by the said instructions stored in the memory to receive one or more requests from one or more applications installed at a client device to obtain a processed sensing data obtained in response to execution of one or more tasks by the application at the client device using a set of sensors associated with the client device. The client device includes a plurality of sensors. Further, the method includes, extracting raw sensor data from the set of sensors, in response to the execution of the one or more tasks. Furthermore, the method includes, configuring a data stream which includes the raw sensor data extracted from the set of sensors in a predefined format and a task information associated with the tasks. Subsequently, connecting the client device with the server to transmit the data stream to the server. The server outputs the processed sensing data upon processing the data stream and the task information by using one or more task specific models stored at the server. Further, the method includes, receiving the processed sensing data from the server. Finally, the method includes, providing the processed sensing data to the one or more applications.

In yet another embodiment, a non-transitory computer-readable medium having embodied thereon a computer program for executing a method for mobile sensing data processing is provided. The method includes facilitating, at a computing device, receiving one or more requests from one or more applications installed at a client device to obtain a processed sensing data obtained in response to execution of one or more tasks by the application at the client device using a set of sensors associated with the client device. The client device includes a plurality of sensors. Further, the method includes, extracting raw sensor data from the set of sensors, in response to the execution of the one or more tasks. Furthermore, the method includes, configuring a data stream which includes the raw sensor data extracted from the set of sensors in a predefined format and a task information associated with the tasks. Subsequently, connecting the client device with the server to transmit the data stream to the server. The server outputs the processed sensing data upon processing the data stream and the task information by using one or more task specific models stored at the server. Further, the method includes, receiving the processed sensing data from the server. Finally, the method includes, providing the processed sensing data to the one or more applications.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

DETAILED DESCRIPTION

Figure 1:
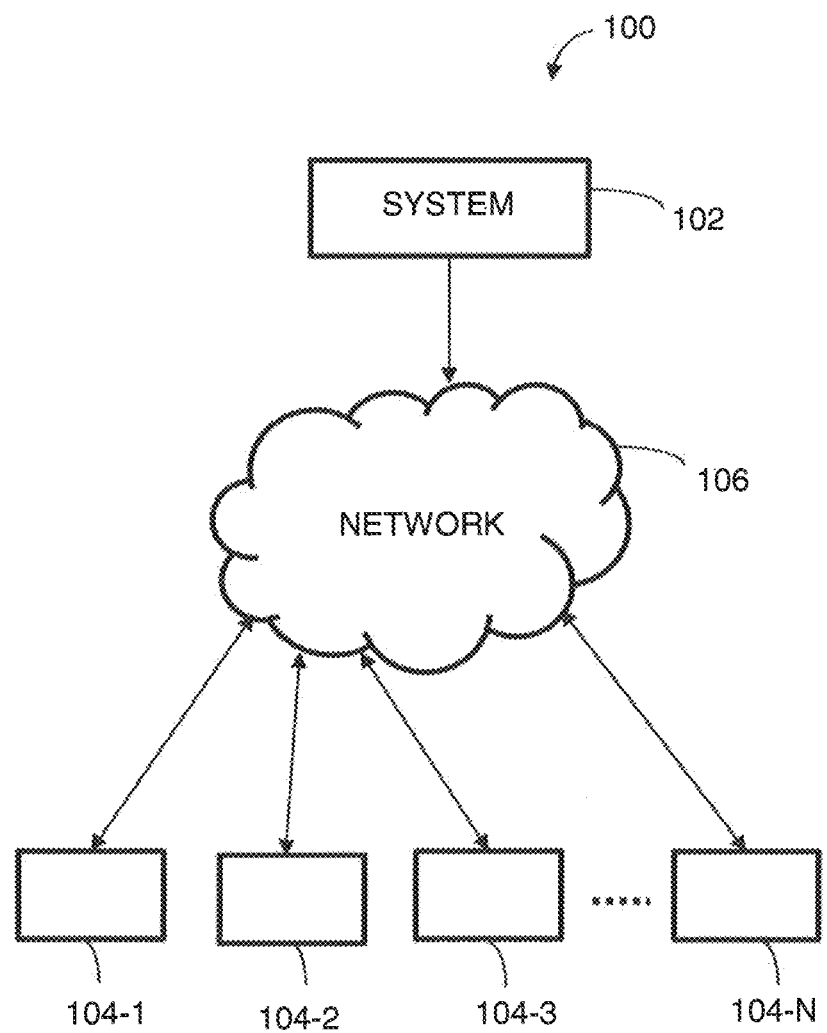
FIG. 1 illustrates a network implementation for mobile sensing data processing, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The methods and systems are not limited to the specific embodiments described herein. In addition, the method and system can be practiced independently and separately from other modules and methods described herein. Each device element/module and method can be used in combination with other elements/modules and other methods.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The embodiments herein provide a system and method for mobile sensing data processing. The disclosed system enables development of pervasive heterogeneous sensing application by abstracting sensor data. Herein, heterogeneous sensing refers to utilization of sensor data acquired from different types of sensors in data processing. The disclosed method and system are not limited to the cited example scenarios and can be included in a variety of applications and scenarios without departing from the scope of the embodiments. Referring now to the drawings, and more particularly to FIGS. 1 through 4B, where similar reference characters denote corresponding features consistently throughout the figures, there are shown preferred embodiments and these embodiments are described in the context of the following exemplary system and/or method.

The purpose of mobile sensing data processing is to allow access to a plurality of sensors present in a client device concurrently and to transfer the processing unit to a cloud-based server. The present system is divided into two units, one is the sensing unit present on the client device and the other one is the processing and management unit present on a cloud-based server or server. The terms cloud-based server and server can be used interchangeably. The client device refers to a mobile device which has a plurality of applications installed. The applications installed on the mobile devices may also be referred to as mobile applications. The terms mobile applications and applications can be used interchangeably.

Various embodiments disclosed herein provides methods and system for mobile sensing data processing, thereby achieving increased mobile performance and making the user applications independent of mobile processor power. An example of a mobile sensing data processing is described further with reference to FIG. 1.

FIG. 1 illustrates a network implementation 100 for mobile sensing data processing, in accordance with an embodiment of the present subject matter. The network implementation 100 is shown to include a system 102 which can be implemented in one or more computing devices, such as devices 104-1, 104-2 . . . 104-N, and a communication network 106 for facilitating communication between the system 102 and the devices 104-1, 104-2 . . . 104-N. In an embodiment, the devices 104-1, 104-2 . . . 104-N may include client devices and a server. For example, the client devices 104-1, 104-2 . . . , may be client devices while the device 104-N may be a server. Each of the client devices may include multiple applications and multiple sensors, such that said applications may utilize the data generated from said sensors for performing certain tasks. For example, the client device 104-1 may include a heart rate monitoring application that may utilize the sensor data generated from sensors such as a camera sensor installed in the client device 104-1 which captures video sequence of a user's index fingertip, to acquire photoplethysmogram (PPG) signal. The system 102 processes said sensor data to output processed sensor data that can be utilized by the application to derive corresponding output. In an embodiment, the system 102 may be embodied distributedly in the client device such as client device 104-1 and the server such as the server 104-N and provides a common platform for mobile sensing data processing. Herein, it will be understood that the system 102 may also be implemented as a variety of computing platforms, such as Android®, iOS®, Symbian®, Windows®, Blackberry®, and the like. In one implementation, the system 102 may be implemented in a cloud-based environment. Examples of the client devices 104 may include, but are not limited to, a portable computer, a personal digital assistant, a handheld device, and a workstation mobile headset, and the like.

In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example. Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The disclosed system 102 provides the mobile sensing framework to enable development of pervasive heterogeneous sensing application. Herein, pervasive heterogeneous sensing refers to extensive utilization of sensor data acquired from different types of sensors in data processing. Further, a framework refers to a basic structure underlying a system or a concept. The present framework includes a sensing unit embodied on the client device and a processing and management unit embodied on a server. The client device refers to a mobile device that may have a plurality of applications installed thereon. Said applications may also be referred to as mobile applications. The purpose of data processing on the mobile sensing framework is to allow access to the plurality of sensors (installed on the client device) concurrently and to transfer the processing functionalities of the system to the server, for example the server 104-N. An example implementation of the system 102 is described further in details with reference to FIG. 2.

Figure 2:
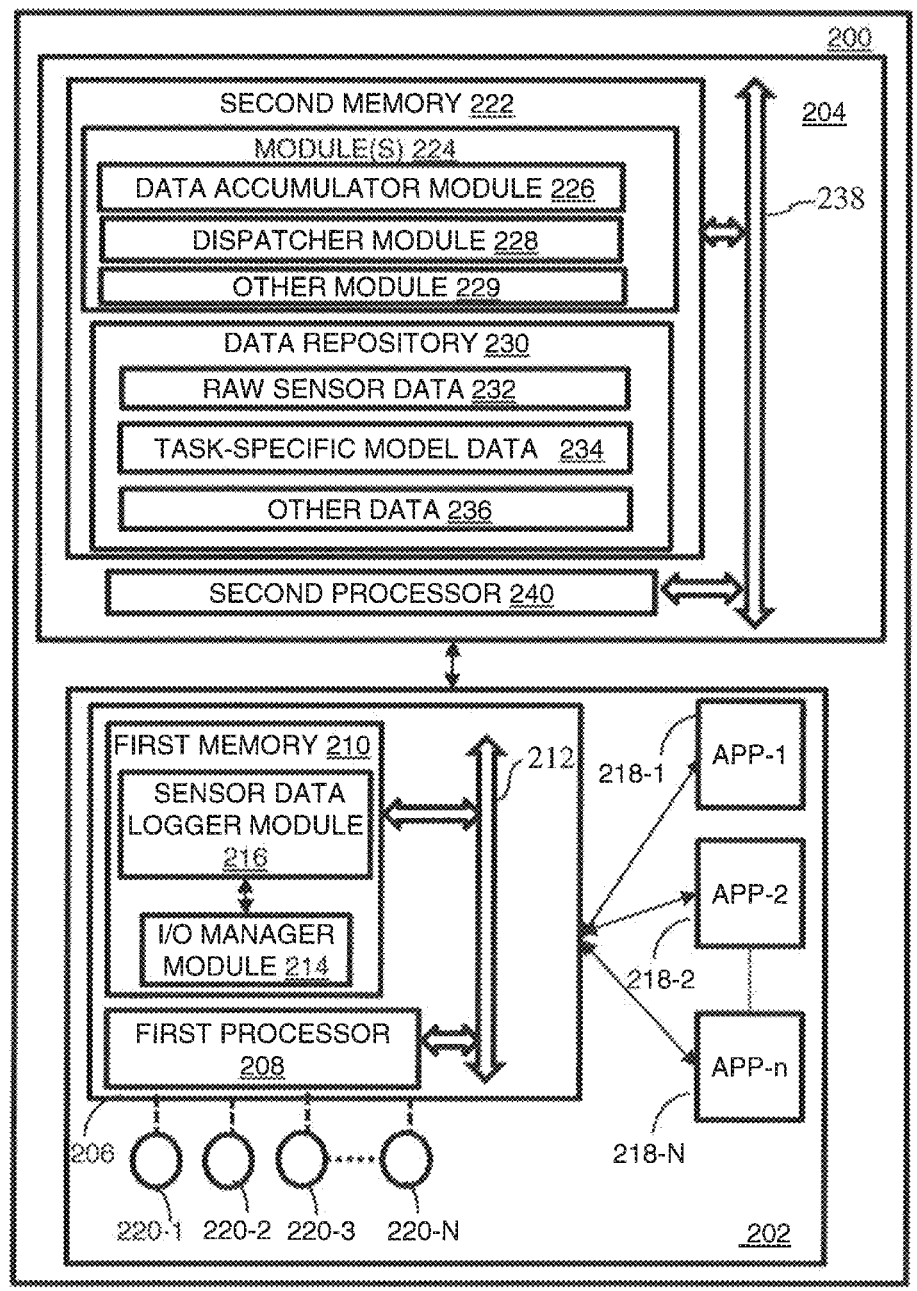
FIG. 2 illustrates a framework for mobile sensing data processing, in accordance with an embodiment.

FIG. 2 illustrates a system 200 for mobile sensing data processing, according to an embodiment of present disclosure. In an embodiment, the system 200 may be embodied or executed in a computing device, for instance the computing device 102 (FIG. 1). Alternatively, the system 200 may be a distributed system distributed in a plurality of computing devices associated with the mobile sensing framework. For example, the system 200 may be distributed in a client device (for example, the client device 104-1 of FIG. 1) and a server (104-N of FIG. 1) to enable sensing and processing functionalities associated with the system 200. The system 200 may include a sensing unit 206 having components of the system 200 for enabling sensing functionalities of the system 200, and a processing and management unit 204 for enabling processing functionalities of the system 200. The sensing unit 206 may be embodied in the client device 202 while the processing and management unit 204 may be embodied in the server. The processing and management unit 204 and the server may be used interchangeably. Various components of the sensing unit 206 and the processing and management unit 204, along with respective functionalities thereof are explained below.

The sensing unit 206 is embodied on the client side in form of an Information Technology (IT) application. In an implementation, the sensing unit 206 may include hardware and software that may be collectively configured to host the IT application for performing various functions pertaining to the sensing functionalities of the system 200.

In an embodiment, the sensing unit 206 is embodied in the client device, and may be communicably coupled to the applications and sensors embodied in the client device. For example, as illustrated with reference to FIG. 2, the client device 202 includes a plurality of applications such as 218-1, 218-2, 218-3 . . . 218-N and a plurality of sensors 220-1, 220-2, 220-3 . . . 220-N. The plurality of sensors 220-1, 220-2, 220-3 . . . 220-N, collectively referred to as sensors 220 hereinafter, embodied on the client device 202 may include a camera sensor, an accelerometer, a gyroscope, a proximity sensor, a barometer, a magnetometer, a pedometer, a humidity sensor, a fingerprint sensor and the like. The client device 202 also includes a plurality of applications 218-1, 218-2, 218-3 . . . 218-N (hereinafter referred to as applications 218). Herein the applications 218 may include hardware and software that may be collectively configured to host IT applications for performing various functions pertaining to the said applications. The sensing unit 206 includes or is otherwise in communication with at least one first processor such as a first processor 208 and at least one first memory such as a memory 210. The first processor 208 and the first memory 210 may be coupled by a system bus such as a system bus 212 or a similar mechanism. The processing and management unit 204 includes or is otherwise in communication with at least one second processor such as a second processor 240 and at least one second memory such as a memory 222. The second processor 240 and the second memory 222 may be coupled by a system bus such as a system bus 238 or a similar mechanism.

In an embodiment, the first processor 208 and the second processor 240 may include circuitry implementing, among others, logic functions associated with the communication. For example, first processor 208 and the second processor 240 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The first processor 208 and the second processor 240 may include, among other things, a clock, an arithmetic logic unit (ALU) and logic gates configured to support operation of the first and second processors 208, 240. Further, the first and the second processors 208, 240 may include functionality to execute one or more software programs, which may be stored in the first and second memories 210, 222 respectively or otherwise accessible to the first processor 208 and the second processor 240, respectively.

The at least one first memory such as a memory 210 and the at least one second memory such as a memory 222, may store any number of pieces of information, and data, used by the system to implement the functions of the system 200. The first and the second memory 210, 222 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The first memory 210 and the second memory 222 may be configured to store information, data, applications, instructions or the like for enabling the sensing unit 206 and the processing and the management unit 204 respectively to carry out various functions in accordance with various example embodiments.

Additionally or alternatively, the first memory 210 and the second memory 222 may be configured to store instructions which when executed by the first processor 208 and the second processor 240 respectively causes the system 200 to behave in a manner as described in various embodiments.

In an embodiment, said instructions may be in the form of a program or software. The software may be in the form of system software or application software. The system for mobile sensing data processing, may be facilitated through a computer implemented application available over a network such as the Internet. In an embodiment, for performing the functionalities associated with mobile sensing data processing system (described with reference to FIGS. 1 to 4B), the first memory 210 and the second memory 222 of the system 200 may include multiple modules or software programs that may be executed by the first processor 208 and the second processor 240. For instance, the memory 210 may include module(s). The module(s) includes, for example, an I/O manager module 214 and a sensor data logger module 216. Also, the second memory 222 may include module(s) 224 and a data repository 230. The module(s) 224 includes, for example, a data accumulator module 226, a dispatcher module 228, and other module(s) 229. The other modules 229 may include programs or coded instructions that supplement applications or functions performed by the system 200. The data repository 230 may include raw sensor data 232, task-specific model data 234 and other data 236. Further, the other data 236 amongst other things, may serve as a repository for storing data that is processed, received, or generated as a result of the execution of one or more modules in the module(s) 224.

In an embodiment, the applications 218 may be initiated to perform one or more tasks. For example, a heart rate monitoring application may be initiated to monitor the heart rate of a user, a location tracking application may be initiated to determine location of the mobile device, and so on. To perform said tasks, the applications may send requests to the sensing unit 206 to obtain data from the sensors 220. Herein, it will be noted that each of the applications 218 are adapted to receive data from specific sensors for execution of respective tasks. For instance, the heart rate monitoring application may require input data from heart rate measuring sensor, a location tracking application may require input data from location tracking sensor, and so on. It will also be noted that the plurality of sensors embodied within the client device 202 are configured to provide raw sensor data, for example, raw sensor data or unprocessed data is obtained from a plurality of sensors such as accelerometer, gyroscope, magnetometer and the like. The raw sensor data may be processed to obtain processed sensing data that can be consumed by the respective applications for performing mobile sensing.

In an embodiment, the sensing unit 206 may receive the requests from the applications 218 to obtain processed sensing data in response to execution of the tasks by said applications. In an embodiment, the I/O module 214 in the sensing unit 206 receives request for the processed sensing data associated with a set of sensors, from the one or more applications 218. For example, to initiate sensing and processing of the data, the application 218 may send an intent to create a task and pass the intent to the I/O Manager module 214 to initiate data processing. An intent is an abstract description of a task to be performed by the system 200.

In an embodiment, the application 218 provides the task to be completed in a JavaScript Object Notation (JSON). JSON is a lightweight text-based open standard designed for human-readable data interchange. JSON stores the task including one or more parameters to be computed, a set of sensors required for the said computation, sensor specific parameters and duration of capturing the raw sensing data. JSON can include as many tasks to calculate different parameters. In an example embodiment, an application for activity estimation may utilize a set of sensors like accelerometer, global positioning system (GPS) and the like. In an alternate embodiment, common sets of sensors can also be used for multiple tasks, for example, an accelerometer sensor may be utilized by an activity tracker application and a car safety application simultaneously for multiple tasks. The JSON format has to be adhered for successful completion of task.

In the following example embodiment, JSON is created for a single task to estimate "Activity" parameters using the "accelerometer" and "gyroscope" sensors data given other sensor parameters.

```
JSON format
{
"tasks":
{
"id" : "1000"
"parameter" : "Activity",
"sensors":
{
{
"sensor" : "accelerometer",
"frequency" : "10"
.........//Other Sensor parameters
},
{
"sensor" : "gyroscope",
"frequency" : "15"
.........//Other Sensor parameters
}
}
"duration" : "10"
}
}
```

The intent is used to send task details associated with the tasks and sensor information as a bundle to the processing and management unit 204 embodied in the server. The task details include a task associated with the request and one or more parameters to be computed in response to the request. The sensor information includes the set of sensors that are required to compute the parameters and the sensor id associated with the said set of sensors. The bundle stores JSON, and an application broadcast receiver name.

The I/O manager module 214 receives the JSON and parses it to retrieve the task details and the sensor information. According to the JSON description, the set of sensors are registered to capture raw data with its timestamp in accordance to the intent from the user application 218. The I/O manager module 214 includes predefined implementations of sensor registrations and data acquisitions techniques. The set of sensors are registered with one or more sensor parameters as provided by the user application 218 to start receiving the raw data. The I/O manager module 214 has a data acquisitions module to create uniformity in different sensors data by representing it as a common class object called a dataobject. The dataobject is capable of storing the raw data and sensor information. Herein, the sensor information refers to the details of a sensor from which the raw data is extracted. For example, sensor information may include name of a sensor, time and duration for which data was extracted from the said sensor and the like. A data stream for the raw data is created for transmission and parallel accessing by the I/O manager module 214. Further, the I/O manager module 214 sends the data stream to the sensor data logger module 216. The I/O manager module 214 also receives an output result comprising the processed sensing data after processing which is broadcasted back to the application 218. Moreover, the I/O manager module 216 also handles sensor callback. A callback is a piece of code which is executed when a particular event occurs.

The sensor data logger module 216 establishes a seamless connection to the processing and management unit 204 embodied in the server. Further, the sensor data logger module 216 transfers the data stream asynchronously without hampering the responsiveness of interface of the application 218. The data stream received from the I/O manager module 214 is serialized into bytes format for TCP based transmission by the sensor data logger module 216. Furthermore, the sensor data logger module 216 creates a socket connection to the server (it is assumed that there is no data loss in TCP connection). The data stream coupled with the task details is pushed into the socket channel to the server.

As described above, the processing and management unit 204 is hosted on the server to manage processing of the raw sensor data. In an embodiment, the processing and management unit 204 is adapted to receive the raw sensor data from the sensing unit 206, and translate said raw sensor data into processed sensing data. The second memory 222 of the processing and management unit 204 includes the data accumulator module 226, and the dispatcher module 228. The data accumulator module 226 receives the data stream extracted from the mobile device to accumulate in one or more sensor data-pools and passes the raw sensor data in the sensor data pools to the second processor 240. The sensor data-pools handle sequencing of the raw sensor data based on the timestamp which is managed by queue data structure. The data accumulator module 226 receives bytes of formatted raw data from the data stream. Further, the data accumulator module 226 de-serializes said bytes of formatted raw data back to dataobject. Depending upon the sensor information included in the dataobject, the sensor information is partitioned into the sensor data-pools. For example, the raw sensor data received from an accelerometer sensor is stored in the accelerometer sensor data-pool. Said process of sequencing the raw sensor data by the sensor data-pools is done in real-time without storing any buffer. The instance of these sensor data-pools are now readily accessible for processing by the second processor 240.

The second processor 240 includes one or more task specific models which have a plurality of models to process the raw sensor data. The plurality of models can be utilized to compute several parameters such as heart rate, blood pressure, activity/inactivity, fall detection and the like. The second processor 240 also facilitates addition of new models. It will be noted that the plurality of models are developed using similar flow architecture to process data. The flow architecture is a process of creating a standard for flow of computation and input/output (I/O) format. All models should have the same flow of computation and same input and output format. For instance, flow may include:

Flow: input-preprocessing-processing-post-processing-output

As per the task details received from the application 218, the second processor 240 in the server instantiates respective models within the task specific models. The second processor 240 fetches the raw sensor data from respective sensor data-pool. The second processor 240 further processes the raw sensor data to obtain the processed sensor data. The processed sensor data may include one or more parameters that may be utilized by the applications for execution of tasks. Multiple models can use the same raw sensor data to process simultaneously and single model can also use multiple sensors data. Depending upon the size of the data, frequency and so on the model processes the raw sensor data and outputs processed sensor data with an output code. The output code signifies whether the model ran successfully or not. Further, the processed sensor data are redirected to the dispatcher module 228.

The dispatcher module 228 receives the processed sensing data from the second processor 240. Further, the dispatcher module 228 creates an HTTP response content with the processed sensor data from the second processor 240. The HTTP response also includes the output code signifying whether the model ran successfully or not. The dispatcher module 228 sends the HTTP response using the same socket connection created initially for sending the data stream, to the sensing unit 206 embodied on the client side. The I/O manager module 214 receives the HTTP response, and broadcasts the processed sensing data through a broadcast receiver to the application 218. The broadcast receiver responds to system-wide broadcast announcements. When the sensing unit 206 broadcasts the processed sensing data as an Intent bundle, the broadcast receiver receives the processed sensing data.

In an embodiment, the intent may also be used to complete previously running tasks initiated by the applications 218 to fetch results in the form of processed sensing data. For example, the sensing unit 206 may stop sending the raw sensor data to the processing and management unit 204 in the server and thereby, releasing the resources being utilized for processing the raw sensor data. Thereafter, the processing and management unit 204 is prompted to push back the processed sensing data if available.

In an embodiment, the raw sensor data may be stored in the data repository 230 embodies in the processing and management unit 204. The processed sensing data may also be stored as other data in the data repository 230 within the server for future analysis. For example, data obtained from a heart rate monitoring sensor may be stored in the data repository 230 for periodic or future analysis of health of a user.

Figure 3:
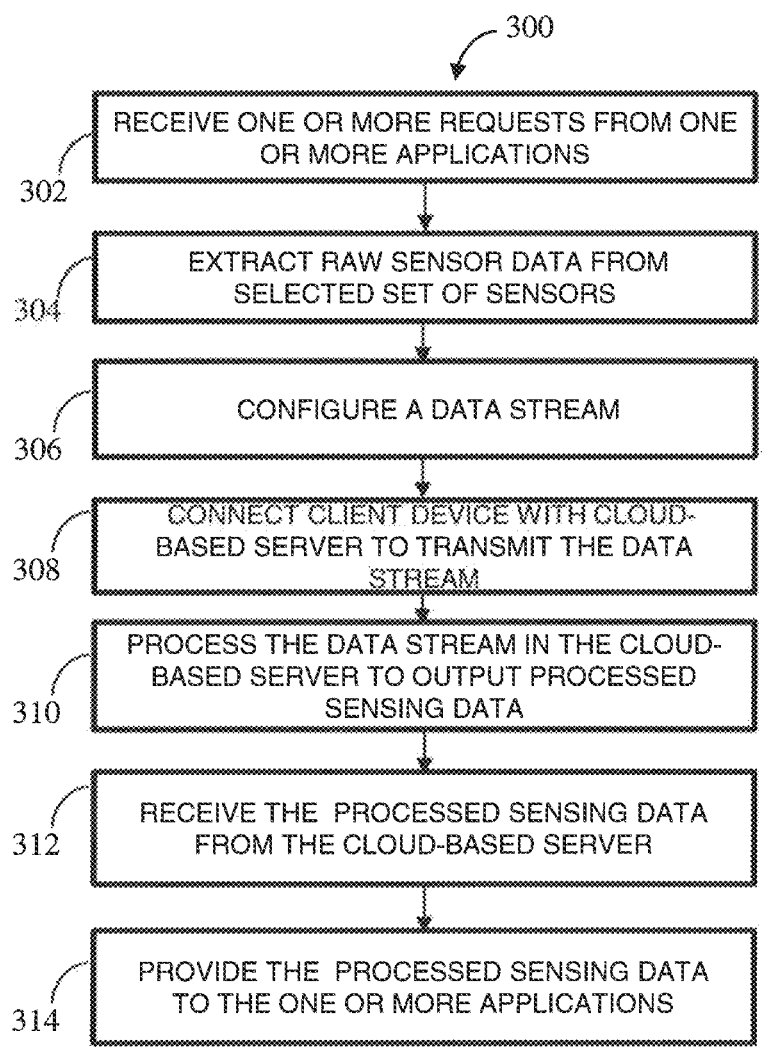
FIG. 3 illustrates a process flow of method for mobile sensing data processing, in accordance with an embodiment.

FIG. 3 illustrates a process flow of method for mobile sensing data processing, in accordance with an embodiment.

In an embodiment, the method 300 for mobile sensing data processing can be implemented at a system, for example, the system 200 (FIG. 2).

At step 302 of method 300, one or more requests is received at the system from one or more user applications installed at the client device. The request received is indicative of one or more tasks to be executed by the client device. The tasks are executed to obtain processed sensing data by the applications at the client device using a set of sensors. The set of sensors are selected from a plurality of sensors that are present on the client device. The set of sensors are selected on the basis of the request received by the client device from the applications. The plurality of sensors may include a camera sensor, an accelerometer, a gyroscope, a proximity sensor, a barometer, a magnetometer, a pedometer, a humidity sensor, a fingerprint sensor and the like. Requests from multiple applications can be received and processed simultaneously.

At step 304 of method 300, the raw sensor data is extracted from the set of sensors. The set of sensors from which the raw sensor data is extracted is based on the task and the set of sensors are registered with the I/O manager module (I/O manager module 214 as in FIG. 2). The I/O manager module extracts the raw sensor data from the set of sensors after registration.

At step 306 of method 300, a data stream is configured to include the raw sensor data extracted from the set of sensors in a pre-defined format and a task information associated with the one or more tasks. The raw sensor data is serialized into a byte format to obtain a serialized data. Serialization is a process of converting the raw data in a single format and packing all the serialized data to create a single data stream. The data stream includes packets of data which are sent to the server for processing. First packet of data includes an application id and sensor details which are related to the task information to be performed by the system. The packets of the data stream following the first packet of data includes only the serialized data. For example, accelerometer data (A), gyroscope data (G) and camera data (C) is extracted. A frequency—100 (per sec), G frequency—100 (per sec), C frequency—30 (per sec) and a stream sending duration of 0.5 sec is considered. Hence, the stream sending duration after 0.5 sec will be 50A, 50G and 15C respectively. After converting all the data in a same format, the data is packed in the form of 50A+50G+15C sequence in the data stream and send it to the server for processing.

At step 308 of method 300, a connection is created with the client device and the server to transmit the data stream to the server. The first packet of data of the data stream which includes the application id and sensor details is transmitted first and the packets of data containing the serialized data follow the first packet of data.

At step 310 of method 300, the data stream is processed in server to output processed sensor data. The data stream is processed by one or more task specific models present in the server. The data stream includes serialized data which is de-serialized in the server to obtain de-serialized data. De-serialization is the process of obtaining sensor data from the data stream. Further, the de-serialized data is identified based on the task specific models. The de-serialized data is replicated based on the requests and the parameters to be computed. Furthermore, the de-serialized data is segmented into a plurality of sensor-wise data pools based on timestamps of the raw sensor data in the de-serialized data. The task specific models include a plurality of algorithms to process the de-serialized data. The task specific models are instantiated to process the sensor-wise data pools and output calculated parameters.

In an embodiment, the same sensor-wise data pools can be used by multiple task specific models. The output of a task specific model can also be used by another task specific model to output processed sensing data.

At step 312 of method 300, the processed sensing data are received by the client device from the server. At step 314 of method 300, the processed sensing data are provided to the applications by segregating the processed sensing data based on the requests comprising intent to obtain segregated processed sensing data. The segregated processed sensing data are transmitted by a broadcast receiver to the applications in the client device.

Figure 4A:
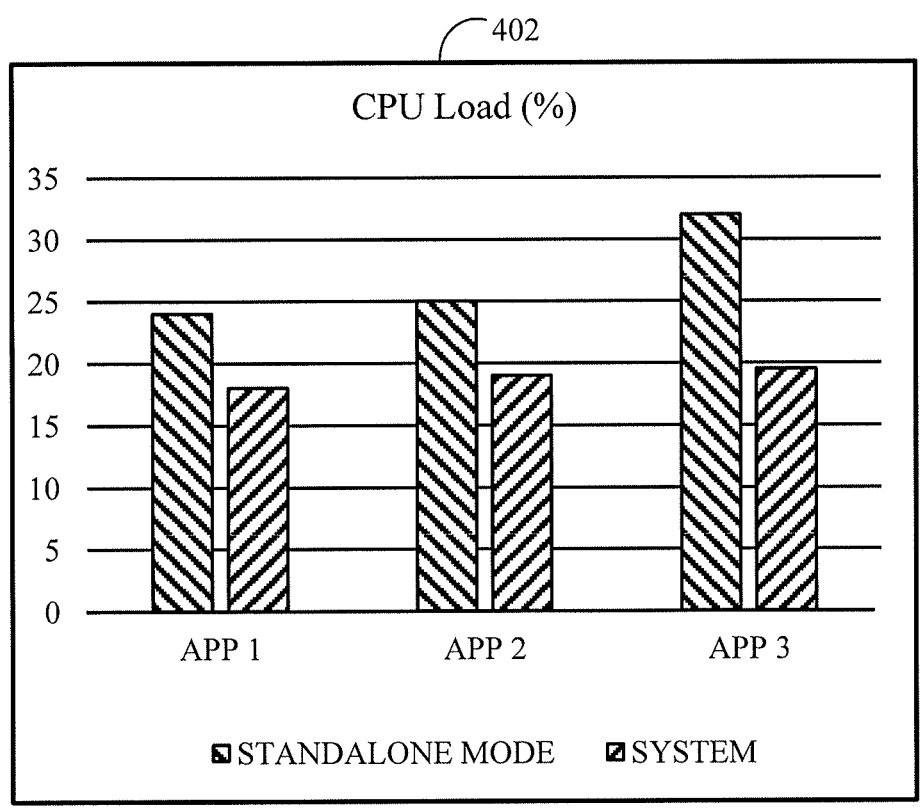
FIGS. 4A and 4B illustrate an example embodiment for mobile sensing data processing.
Figure 4B:
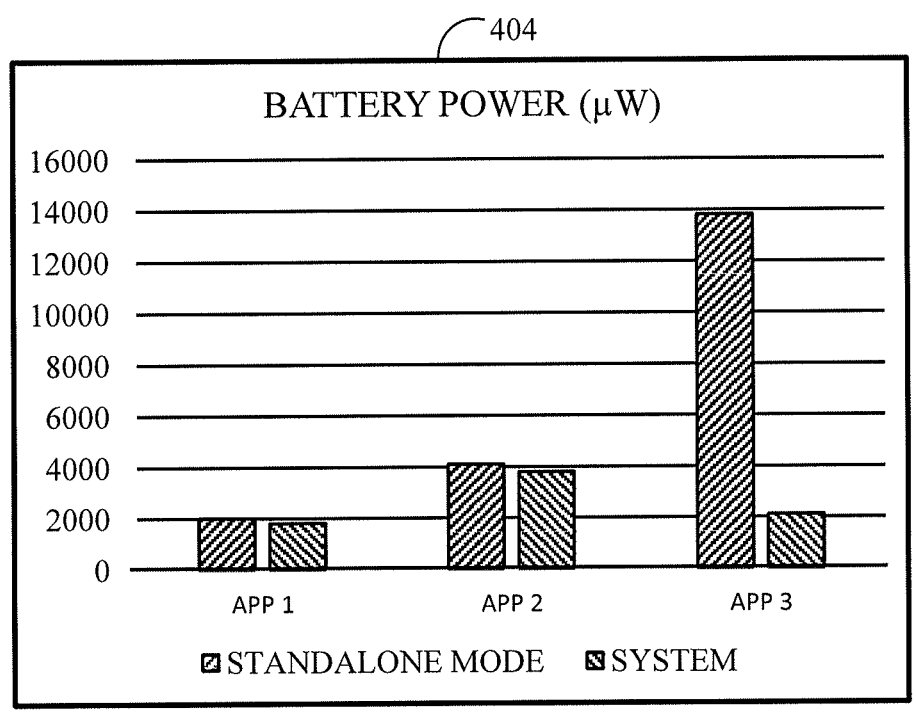

FIGS. 4A and 4B illustrate an example embodiment for mobile sensing data processing. The figures illustrate performance improvement in data processing by plurality of mobile devices by using the disclosed system 200 (as depicted in FIG. 2). The system 200 is used on three user applications which use several mobile sensors to make it pervasive. Working of the three user applications App1, App2 and App3 are compared using the present system 200 and a standalone mode. The standalone mode is one in which the processing of the raw sensor data is done within the processor of the mobile device. FIG. 4A is a bar graph illustrating performance of App1, App2 and App3 in both, the present system and in the standalone mode. Further, in FIG. 4A x-axis depicts the CPU load in percentage and y-axis depicts the performance of App1, App2 and App3.

Similarly, FIG. 4B illustrates battery power consumptions of App1, App2 and App3 in standalone mode and using the present system. In FIG. 4B x-axis depicts battery power in micro watt (μW) and y-axis depicts the performance of App1, App2 and App3.

App1 is an application to estimate human heart rate (HR) and blood pressure (BP) values from photoplethysmogram (PPG) signal. The PPG signal is extracted from a video sequence of a user's index fingertip, acquired using a camera sensor present on a mobile device. The application estimates systolic and diastolic BP values, within a range of ±10% of clinical measurement. The system is utilized to fetch the video signal from the camera sensor and transferring it to the server, where the Blood Pressure and Heart Rate algorithm are stored. After estimation of vitals, result is fetched from server and broadcasted to App1. In FIG. 4A it is seen that when the App1 is operated using the present system the CPU load percentage is only 17% as compared to the standalone mode where the CPU load percentage is 24%. Further, FIG. 4B depicts that the battery power consumed by the App1 is lower, that is 1800 micro watt when it is operated using the present system as compared to the standalone mode where the battery power consumed is 2000 micro watt.

App2 is an application which provides training-free and orientation-and-placement-independent step-count and activity estimation on a mobile device. A 3D accelerometer sensor of the mobile device is used for activity estimation. It uses "step-frequency" as a feature to identify various activities. App2 provides real-time step counts. It classifies current activity, and tags each activity with the respective steps, resulting in a detail analysis of activity estimation. Classification of step-based activity is done as walking, brisk-walking and running (includes jogging). The present system assists App2 to estimate step count in the server by seamlessly transferring accelerometer data and keep updating the User interface (UI) of App2 by fetching result from server every 2 seconds. Moreover, in FIG. 4A it can be seen that when the App2 is operated using the present system the CPU load percentage is only 19% as compared to the standalone mode where the CPU load percentage is 25%. Further, FIG. 4B depicts that the battery power consumed by the App2 is lower, that is 3800 micro watt when it is operated using the present system as compared to the standalone mode where the battery power consumed is 4000 micro watt.

App3 is an application for evacuation localization in a building using magnetometer and Wi-Fi. It uses the magnetometer of the mobile device to estimate the entry or exit of a person using magneto fence interference and Wi-Fi to locate the zone of a person in the floor. The present system facilitates the use of simple sensors like Wi-Fi and magnetometer data to estimate evacuation in the server for future evacuation planning. Further, it is illustrated in FIG. 4A that when the App2 is operated using the present system the CPU load percentage is only 19.5% as compared to the standalone mode where the CPU load percentage is 32%. Further, FIG. 4B depicts that the battery power consumed by the App1 is lower, that is 2100 micro watt when it is operated using the present system as compared to the standalone mode where the battery power consumed is 13800 micro watt.

Hence it is clearly illustrated by FIG. 4A and FIG. 4B that the system reduces the CPU usage and battery power consumption respectively by the applications.

In an example embodiment, the system can be used in various areas of collaborative sensing such as in hospitals, insurance companies, industries and the like for remote monitoring, historical analysis and disaster management using robot. In hospitals, the system can be used as remote monitoring and tele-rehabilitation of a patient. It stores all the raw data (for example PPG) coming from mobile sensors as well as calculated results such as HR and BP, which can help in historical analysis of patient for prognosis or diagnosis.

In another embodiment, road conditions can be monitored using mobile device sensors remotely. Insurance companies can also use this system to monitor drivers' behavior based on analysis of accelerometer and GPS data of fixed duration. All these analyses will help insurance companies to clear claims and in renewal policies.

In an alternate embodiment, the system can be utilized in robotics, 3D environment reconstruction, thermal profile analysis and sound source localization all these can be possible by transmitting all sensors (camera, accelerometer, GPS and the like) data to the cloud-based server. Robots for disaster management can also use this system for sharing pose information via cloud-based server, which helps robots to decide path for travel, all these robots and tasks can be monitored and controlled remotely from the cloud-based server side.

The system discloses a mobile sensing and processing platform for heterogeneous sensing, which allows pervasive collaboration on the server for multiple applications. In addition, the system reduces power consumption and processing time of mobile device by partitioning process to the server and the client device. Finally, this system is flexible enough to be deployed on all mobile devices having different processor types or specifications.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented method 300 for mobile sensing data processing having client devices and a server, the method 300 comprising:
   a) receiving, at a hardware including one or more processors and one or more memory devices effecting a client device, one or more requests from one or more applications installed at the client device to obtain processed sensing data obtained in response to execution of one or more tasks by the application at the client device using a set of sensors associated with the client device, wherein the client device comprises a plurality of sensors 302;

b) extracting raw sensor data from the set of sensors in response to the execution of the one or more tasks 304;

c) configuring a data stream comprising the raw sensor data extracted from the set of sensors in a predefined format to obtain serialized data and a task information associated with the one or more tasks 306;

d) connecting the client device with the server to transmit the data stream to the server 308;

wherein the server outputs the processed sensing data upon processing the data stream and the task information by using one or more task-specific models stored at the server 310, and wherein processing the data stream and the task information at the server includes:

de-serializing the serialized data to obtain de-serialized data;

categorizing the de-serialized data based on the one or more task specific models to process the de-serialized data;

replicating the de-serialized data based on the one or more requests and the one or more parameters to be computed in response to the one or more requests;

segmenting the de-serialized data into a plurality of sensor-wise data-pools, the plurality of sensor-wise data-pools capable of handling sequencing of the sensor data based on the corresponding timestamps; and instantiating the one or more task specific models to process the sensor-wise data pools and the task information, to output the processed sensing data;

e) receiving the processed sensing data from the server 312; and f) providing the processed sensing data to the one or more applications 314.

2. The method as claimed in claim 1, wherein a request of the one or more requests comprises an intent encapsulating task details associated with the one or more tasks and sensor information in form of a bundle, the task details comprising a task associated with the request and one or more parameters to be computed in response to the request, and the sensor information comprising information associated with the set of sensors adapted to compute the one or more parameters, one or more sensor specific parameters associated with the one or more parameters, and a duration of capture of the raw sensor data from the set of sensors.

3. The method as claimed in claim 1, wherein configuring the data stream comprises:

parsing the bundle to retrieve the task details and the sensor information associated with the one or more requests;

registering, based on the sensor information, the set of sensors to capture the raw sensor data with corresponding time-stamps; and creating the data stream representing the task details and the raw sensor data captured from the set of sensors.

4. The method as claimed in claim 1, wherein configuring the data stream in the predefined format comprises serializing the raw sensor data into a byte format to obtain the serialized data.

5. The method as claimed in claim 1, wherein processing the processed sensing data at the client device comprises:

parsing the processed sensing data received from the server at the client device;

segregating the processed sensing data based on the one or more requests comprising the intent to obtain segregated processed sensing data; and transmitting the segregated processed sensing data to the one or more applications.

6. The method as claimed in claim 1, wherein the plurality of sensors are selected from a group comprising: a camera sensor, an accelerometer, a gyroscope, a proximity sensor, a barometer, a magnetometer, a pedometer, a humidity sensor and a fingerprint sensor.

7. The method as claimed in claim 1, wherein the server is further adapted to store the processed sensing data.

8. A computer-implemented system 200 for mobile sensing data processing, the system 200 comprising:

a client device 202 comprising a hardware including one or more first processors 208 and one or more first memory devices 210, wherein the one or more first processors 208 are capable of executing programmed instructions stored in the one or more first memory devices 210; and a server 204 comprising a hardware including one or more second processors 240 and one or more second memory devices 222, wherein the one or more second processors 240 are capable of executing programmed instructions stored in the one or more second memory devices 222, wherein the client device 202 is communicably coupled with the server 204, and wherein the programmed instructions stored in the one or more first memory devices 210 are executed to:

receive, at the client device 202 one or more requests from one or more applications installed at the client device 202 to obtain processed sensing data obtained in response to execution of one or more tasks by the application 218 at the client device 202 using a set of sensors associated with the client device, wherein the client device comprises a plurality of sensors 220;

extract raw sensor data from the set of sensors associated with the client device 202, the sensor data received in response to the execution of the one or more tasks;

configure a data stream comprising the raw sensor data extracted from the set of sensors in a predefined format to obtain serialized data and a task information associated with the one or more tasks;

connect the client device 202 with the server 204 to transmit the data stream to the server 204, wherein the server 204 outputs the processed sensing data upon processing the data stream and the task information by using one or more task-specific models stored at the server 204 wherein to process the data stream and the task information at the server 204, the one or more second processors 240 are further configured by the instructions to:

de-serialize the serialized data to obtain de-serialized data;

categorize the de-serialized data based on the one or more task specific models to process the de-serialized data;

replicate the de-serialized data based on the one or more requests and the one or more parameters to be computed in response to the one or more requests;

segment the de-serialized data into a plurality of sensor-wise data-pools, the plurality of sensor-wise data-pools capable of handling sequencing of the sensor data based on the corresponding timestamps; and instantiate the one or more task specific models to process the sensor-wise data pools and the task information, to output the processed sensing data;

receive the processed sensing data from the server 204; and provide the processed sensing data to the one or more applications 218.

9. The system 200 as claimed in claim 8, wherein the one or more first processors 208 are further configured by the instructions to:
- parse the bundle to retrieve the task details and the sensor information associated with the one or more requests;
- register, based on the sensor information, the set of sensors to capture the raw sensor data with corresponding time-stamps; and
- create a data stream representing the task details and the raw sensor data captured from the set of sensors.

10. The system 200 as claimed in claim 9, wherein a request of the one or more requests comprises an intent encapsulating task details associated with the one or more tasks and sensor information in form of a bundle, the task details comprising a task associated with the request and one or more parameters to be computed in response to the request, and the sensor information comprising information associated with the set of sensors adapted to compute the one or more parameters, one or more sensor specific parameters associated with the one or more parameters, and a duration of capture of raw sensor data from the set of sensors.

11. The system 200 as claimed in claim 9, wherein to create the single data stream, the one or more first processors 208 are further configured by the instructions to serialize the raw sensor data into a byte format to obtain the serialized data.

12. The system 200 as claimed in claim 8, wherein to process the processed sensing data, the one or more first processors 208 at the client device are further configured by the instructions to:
- parse the processed sensing data received from the server 204 at the client device 202;
- segregate, the processed sensing data based on the one or more requests comprising the intent to obtain segregated processed sensing data; and
- transmit the segregated processed sensing data to the one or more applications 218.

13. The system 200 as claimed in claim 8, wherein the plurality of sensors 220 are selected from a group comprising: a camera sensor, an accelerometer, a gyroscope, a proximity sensor, a heart rate monitor, a magnetometer, a pedometer, a humidity sensor and a fingerprint sensor.

14. The system 200 as claimed in claim 8, wherein the server 204 is further adapted to store the processed sensing data.

* * * * *